US006477640B1

United States Patent
Rupley, II et al.

(10) Patent No.: US 6,477,640 B1
(45) Date of Patent: Nov. 5, 2002

(54) APPARATUS AND METHOD FOR PREDICTING MULTIPLE BRANCHES AND PERFORMING OUT-OF-ORDER BRANCH RESOLUTION

(75) Inventors: Jeffrey Pidge Rupley, II, Austin, TX (US); Marvin A. Denman, Round Rock, TX (US); Bradley G. Burgess, Austin, TX (US); David C. Holloway, Cedar Park, TX (US)

(73) Assignee: Motorola, Inc., Schamburg, IL (US)

( * ) Notice: Subject to any disclaimer, the term of this patent is extended or adjusted under 35 U.S.C. 154(b) by 0 days.

(21) Appl. No.: 09/659,401

(22) Filed: Sep. 11, 2000

Related U.S. Application Data

(63) Continuation of application No. 09/054,180, filed on Apr. 3, 1998, now Pat. No. 6,157,998.

(51) Int. Cl.[7] .............................................. G06F 15/60
(52) U.S. Cl. ...................... 712/238; 712/216; 712/217; 712/218; 712/219; 712/237; 712/239; 712/240
(58) Field of Search .................... 705/27; 712/237–240, 712/216–219

(56) References Cited

U.S. PATENT DOCUMENTS

| | | | |
|---|---|---|---|
| 4,200,927 A | 4/1980 | Hughes et al. | 364/200 |
| 4,775,927 A | 10/1988 | Hester et al. | 364/200 |
| 5,353,421 A | * 10/1994 | Emma et al. | 712/240 |
| 5,394,529 A | * 2/1995 | Brown et al. | 712/240 |
| 5,454,117 A | * 9/1995 | Puziol et al. | 712/240 |
| 5,560,032 A | * 9/1996 | Nguyen et al. | 712/217 |
| 5,860,017 A | 1/1999 | Sharangpani et al. | 395/800.23 |
| 5,903,918 A | 5/1999 | Bauman et al. | 711/220 |
| 6,029,240 A | 2/2000 | Blaner et al. | 712/23 |

FOREIGN PATENT DOCUMENTS

| | | | |
|---|---|---|---|
| EP | 518420 A2 | * | 12/1992 |
| WO | WO9712317 | * | 4/1997 |

OTHER PUBLICATIONS

Gwennap, Linley; "Hal reveals multichip SPARC processor;" Microprocessor Report, v9, n3, p1(7), Mar. 6, 1995.*
Wilson, Ron; "CPU Designers look beyond superscalar;" Electronic Engineering Times, n917, p14(2); Sep. 2, 1996.*
Feibus, Mike; "The P6 Lite will take a big fat bite of chip–set, board markets;" PC Week, v13, n11, pA16(1); Mar. 18, 1996.*

* cited by examiner

Primary Examiner—Wynn W. Coggins
Assistant Examiner—Forest Thompson, Jr.

(57) ABSTRACT

A branch prediction unit apparatus and method uses an instruction buffer (20), a completion unit (24), and a branch prediction unit (BPU) (28). The instruction buffer (20) and/or the completion unit (24) contain a plurality of instruction entries that contain valid bits and stream identifier (SID) bits. The branch prediction unit contains a plurality of branch prediction buffers (28a–28c). The SID bits are used to associate the pending and executing instructions in the units (20 and 24) into instruction streams related to predicted branches located in the buffers (28a–28c). The SID bits as well as age bits associated with the buffers (28a–28c) are used to perform efficient branch prediction, branch resolution/retirement, and branch misprediction recovery.

8 Claims, 11 Drawing Sheets ial hardware may not be easily scalable
APPARATUS AND METHOD FOR PREDICTING MULTIPLE BRANCHES AND PERFORMING OUT-OF-ORDER BRANCH RESOLUTION This application is a continuation of Ser. No. 09/054,180, filed Apr. 3, 1998, now U.S. Pat. No. 6,157,998.

FIELD OF THE INVENTION

The present invention relates generally to data processing systems, and more particularly to, predicting multiple branch instructions deep into an instruction flow and performing out of order branch resolution on the multiple branch predictions.

BACKGROUND OF THE INVENTION

In the integrated circuit (IC) industry, branch instruction prediction is being used to improve the performance of central processing units (CPU). In a software program, branch instructions are used to selectively send instruction execution flow in one of two different directions based upon some criterion (e.g., if A>B then goto here else goto there, if X=Y then goto here else goto there, if V bit set then goto here else goto there, etc.). If a processor is forced to wait until the path of the branch is clearly determined before fetching instructions for execution from memory, a "gap" in instruction execution flow is experienced within the CPU. It has been found that it is more beneficial to "predict" or "guess" which path the branch will eventually traverse and execute instructions down this speculative path before resolution of the exact branch path is determined. If the CPU correctly predicts the branch path more often than not, performance improvements can usually be achieved by removing the execution "gaps" from the CPU's instruction flow (i.e., the CPU is not sitting idle as long).

However, branch instruction prediction is becoming even more complex in modem microprocessors. It is now desired that a processor predict multiple branches deep in the flow of instruction execution and compound speculation on top of speculation. There are significant performance advantages for CPUs that can predict accurately through multiple branch instructions whereby computer instructions that are multiple branch instructions deep are being speculatively executed. However, when predicting through multiple branch instructions, a significant amount of hardware overhead is usually needed in prior art designs. In many cases, the algorithms that control these larger resources inefficiently schedule or assign the resources whereby otherwise available resources are not available for efficient use. In addition, this additional hardware may not be easily scalable to more complex architectures in order to further improve performance in subsequent generations of the microprocessor's family line. Furthermore, this multiple-branch prediction capability in the architecture may result in difficulty in recovering from a mispredicted branch whereby performance may be adversely impacted if mispredictions occur too frequently.

Therefore, a need exists in the industry for a branch prediction architecture which allows for one or more of branch prediction that progresses multiple branch instructions deep, correction of branch mispredictions in a more efficient manner, reduced hardware overhead associated with the branch architecture, ease of extendibility to more complicated computer architectures to deeper branch prediction, improved allocation of resources, and improved performance.

Figure 1:
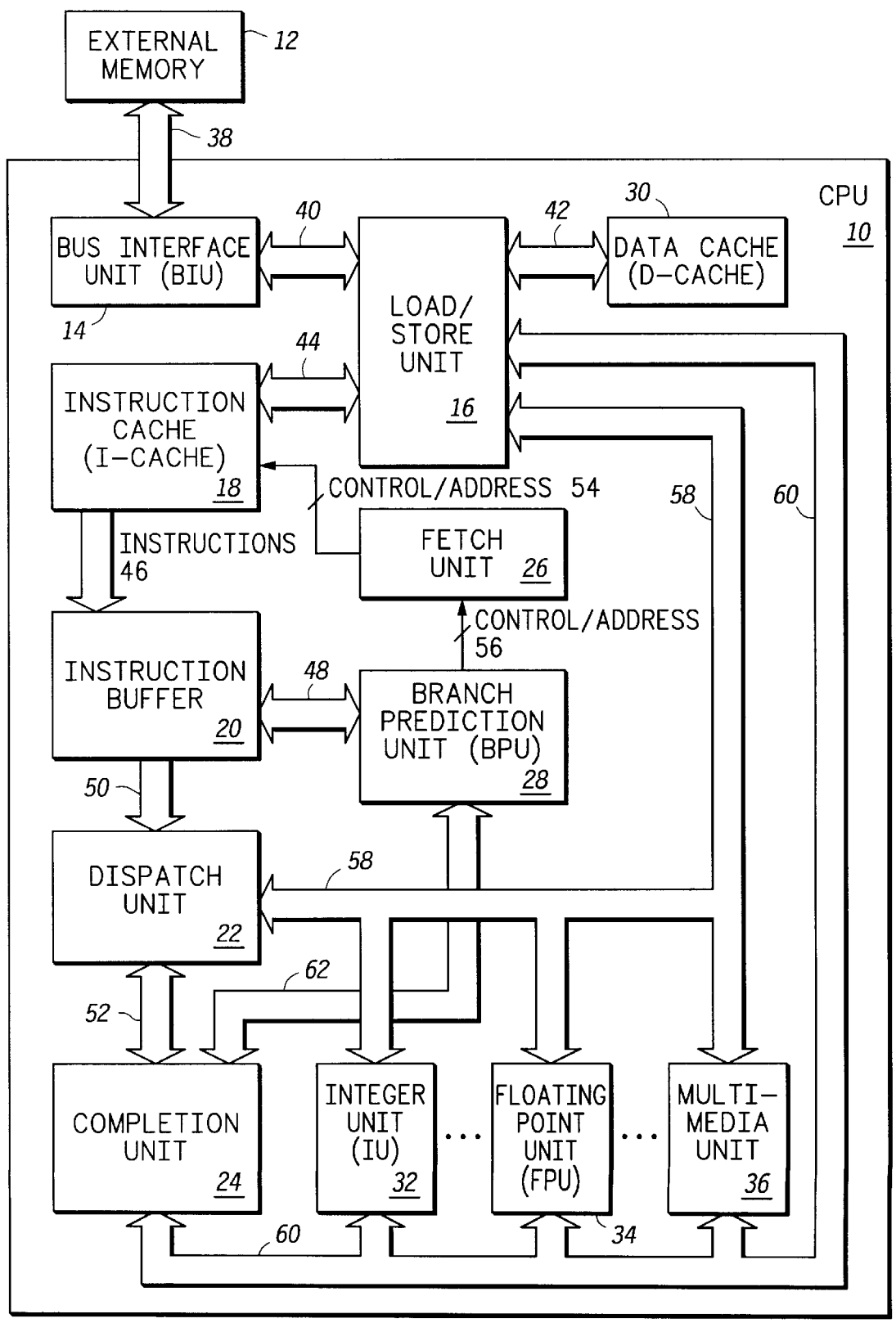
FIG. 1 illustrates, in a block diagram, a computer architecture in accordance with the present invention.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DESCRIPTION OF A PREFERRED EMBODIMENT

Generally, FIGS. 1–11 herein teach an apparatus and method for predicting multiple branches in execution depth and performing out-of-order branch resolution of these predictions within a data processing system. The data processing system generally has an instruction buffer 20, a completion buffer or completion unit 24, and a branch prediction unit (BPU) 28. One or both of the instruction buffer 20 and completion unit 24 contain N stream identifier (SID) bits for each storage entry within the respective unit, N being a positive finite integer. Specifically, three SID bits (N=3) are taught in the specific embodiments taught in the accompanying FIGS. 1–11. The branch prediction unit contains N branch prediction buffers 28a–28c wherein each branch prediction buffer corresponds to a unique one bit position within the SID bits. For example, a first branch prediction buffer would correspond to the bit position 0 in the SID bit field, a second branch prediction buffer would correspond to the bit position 1 in the SID bit field, and so on until an Nth branch prediction buffer would correspond to the bit position N in the SID bit field. However, the association of a unique bit position to a unique branch prediction buffer need not be in any specific numerical order and may even be software programmable in some embodiments.

Each of the N branch prediction buffers within the branch prediction unit (BPU) 28 can be assigned to a single unresolved branch instruction within the data processing system. If an unresolved branch is in need of prediction within the data processing system, this unresolved branch is assigned to one of the unused N branch prediction buffers. After the assignment of a branch prediction buffer, the SID bit position associated with the assigned branch prediction buffer is asserted for all instructions in the instruction buffer that follow the assigned branch instruction in execution flow or program order. In other words, if a segment of code would execute in the order of an ADD, MUL, BRANCH, MOVE, DIV, then the appropriate SID bit position for the MOVE and DIV instruction in the instruction buffer would be set to efficiently associate these MOVE and DIV instructions with the correct or incorrect prediction of the BRANCH instruction. Therefore, by using the N branch prediction buffers and the N bit positions of the SID bits, multiple unresolved branches can be speculatively processed while efficiently identifying which instructions are associated with which branch prediction buffer.

This SID architecture allows for efficient identification of those computer instructions within a central processing unit (CPU) that must be canceled due to the misprediction of any given branch instruction. In addition, there are mechanisms provided to allow the branch prediction buffers to be reused in any order whereby wasted overhead within the data processing system is reduced. The architecture and method taught herein is easily extendible to deeper branch prediction models (e.g., predicting five, seven or ten branches deep) and to more complicated central processing units (CPUs) whereby the performance of the architecture taught herein can be easily scaled for future generation CPUs.

In addition to the use of SID bits, each branch prediction buffer 28a–28c is associated with one or more age bits. These age bits are used to identify an order in which the branch prediction buffers have been assigned to unresolved branch instructions. The age bits allow for efficient cancellation of multiple unresolved branch instructions which lie along a mispredicted path. In other words, if a first branch instruction is age identified as being a newer addition to the BPU and an older branch is mispredicted, it is clear that the newer branch must be cleared from the BPU and from execution due to the misprediction of the older branch that precedes the newer branch in program order. In addition, the age bits allow for an efficient way in which to determine which mispredicted recovery address should be provided to a fetch unit. If two branches are determined to be mispredicted simultaneously or in close proximity in time, then a recovery address associated with the oldest mispredicted branch needs to be sent to the fetch unit. The oldest mispredicted branch can be identified by the age bits.

The invention can be further understood with specific reference to FIGS. 1–11 herein.

FIG. 1 illustrates a specific configuration of a central processing unit (CPU) used within a data processing system. FIG. 1 contains a central processing unit (CPU) 10 which is coupled to an external memory system 12. The CPU 10 contains a bus interface unit (BIU) 14 which communicates with external memory 12 through a bus 38. The bus 38 contains all address, data, and control signals that are necessary for the CPU 10 to effectively communicate with external memory 12 to obtain operand data and instructions for execution by the CPU 10. The bus interface unit (BIU) 14 communicates with the load/store unit 16 through a bus 40. The load store unit 16 is the execution unit or controller that controls the reading of instructions from external memory 12 through the bus interface unit 14. The load/store unit 16 places the read instructions within the instruction cache (I cache) 18 via transmissions through the busses 40 and 44 in FIG. 1.

Once instructions are read into the instruction cache 18, the fetch unit 26 uses control lines and address lines (control/address lines) 54 to control the provision of instructions from the I cache 18 to the instruction buffer 20 through an instruction bus 46. Once instructions are present within the instruction buffer 20, the instruction buffer 20 processes pending instructions to determine if any branch instructions are currently stored within the instruction buffer 20. If one or more branch instructions are stored within the instruction buffer 20, then the branch prediction unit 28 is informed of the presence of these branch instructions via a bus 48 in FIG. 1. The branch prediction unit (BPU) 28 will attempt to resolve or, if resolution is not currently possible, predict whether the branches within the instruction buffer 20 are taken or not taken. This resolution or prediction by the branch prediction unit 28 allows the fetch unit 26, via the control and address lines 56, to continually fetch instructions from the I cache 18 to the instruction buffer 20 in a speculative yet intelligent manner in order to improve system performance.

The dispatch unit 22 will selectively move instructions from the instruction buffer 20 to one or more execution unit shown in FIG. 1 as the integer unit (IU) 32, the floating point unit (FPU) 34, the multimedia unit 36, the load/store unit 16, and/or any other functional units which may be present within the CPU 10 via buses 50 and 58. Simultaneously to the provision of the instruction from the dispatch unit 22 to one of the functional units 16, 32,34, and 36, the dispatch unit 22 dispatches the same instruction via a bus 52 to a completion unit 24. The completion unit 24 communicates with the execution units 16, 32, 34, and 36 via a bus 60 to determine when certain instructions are completed. The completion unit 24 may provide this information and/or other information to the BPU 28 so that the BPU may determine whether or not certain branches were predicted properly. For example, a branch instruction may indicate that the branch is to be taken if A is greater than B where A and B are two integers. While the CPU 10 may know what B is equal to, the integer unit 32 may be processing the value A from a previous instruction in close proximity to the branch in question. Once the completion unit 24 is provided with the value of A, the completion unit and the BPU 28, via the bus 62, may determine if A is greater than B. If so, the branch was properly predicted and the branch instruction is "retired" from the BPU as being correctly predicted. If A is less than or equal to B, then the branch is identified as being mispredicted and misprediction recovery is performed by the BPU 28. Therefore, the completion unit 34 generally communicates with the branch prediction unit 28 via a bus 62 for the specific purpose of resolving unresolved/predicted branch instructions. This communication along the bus 62 is generally enabled so that the branch prediction unit (BPU) 28 may be provided with dependency information which allows the branch prediction unit 28 to resolve branch instructions in due course and out-of-order with each other. In other words, a new branch that is dispatched after a previously dispatched branch may resolve sooner than the previously dispatched branch since the dependency information for the new branch may be available before the previously dispatched branch.

In addition, the load store unit 16 will communicate through a bus 42 to a data cache (D cache) 30. The execution units 32, 34, and 36 receive useful data operands through the bus 58 by communicating with the load store unit 16 and the data cache unit 30. Final computed results may also be written to the data cache 30 from the execution units 32, 34, and 36 via the buses 60 and 42 and the load/store unit 16. The improved method and apparatus taught herein will generally lie within the instruction buffer 20, the dispatch unit 22, the completion unit 24, and the branch prediction unit 28 of FIG. 1. These improvements can be better understood with reference to FIGS. 2–11 as these figures are addressed below.

Figure 2:
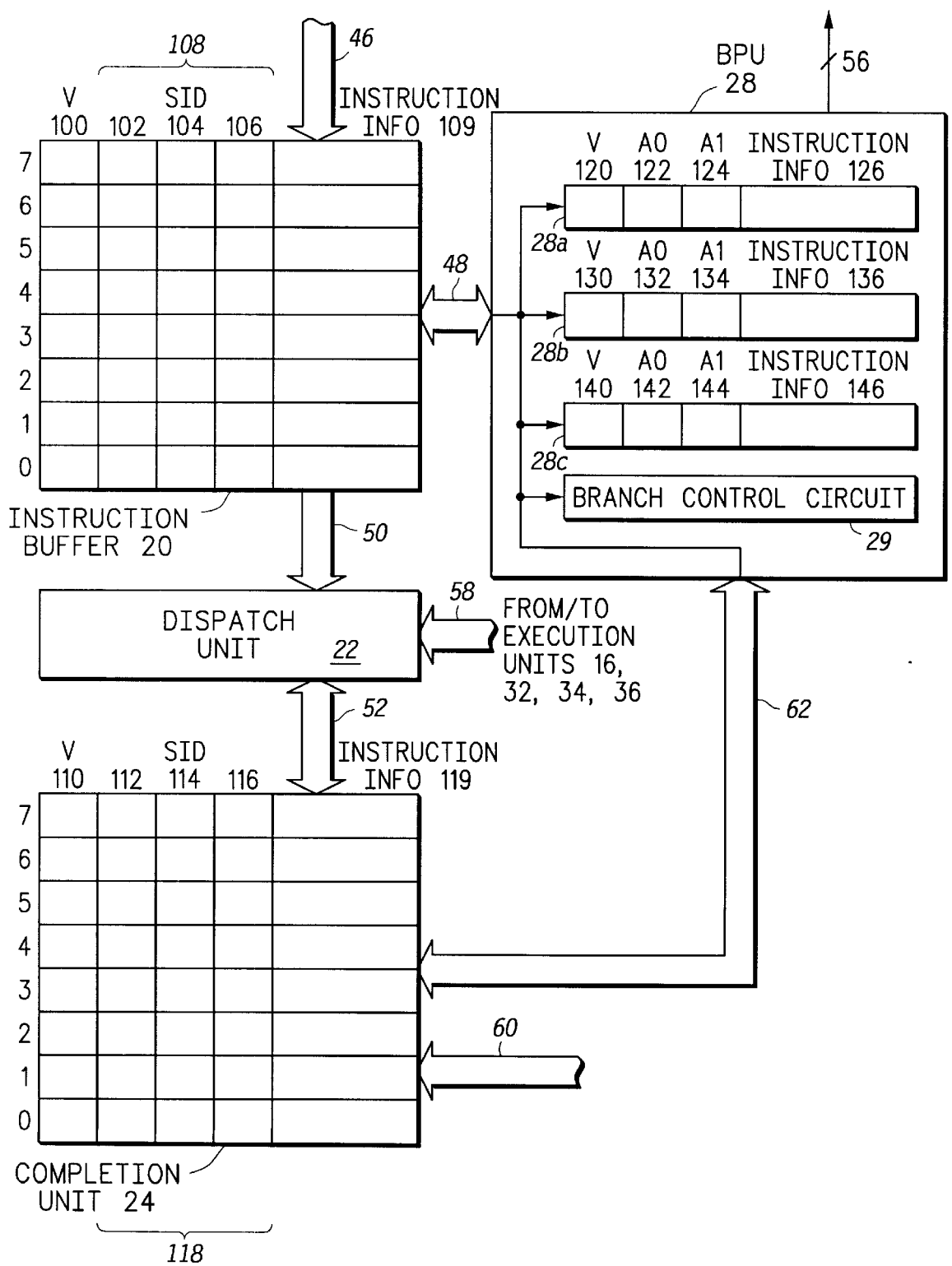
FIG. 2 illustrates, in a block diagram, an instruction buffer, a completion unit, and a branch prediction unit coupled together in accordance with the present invention.

FIG. 2 illustrates the instruction buffer 20, the dispatch unit 22, the completion unit 24, and the branch prediction unit 28 of FIG. 1 in greater detail. The instruction buffer 20 of FIG. 2 may contain any number M of storage entries wherein M is a finite positive integer. In FIG. 2, M is equal to eight whereby the instruction buffer 20 contains eight entries numerically numbered in FIG. 2 from 0 to 7. While FIG. 2 shows eight instruction buffer entries, it should be understood that any number of entries (even one entry) may be implemented depending upon the design requirements of the system. Each of the eight entries within the instruction buffer 20 contains a valid (V) bit 100, N stream identifier (SID) bits 108 where N is a finite positive integer, and an instruction information field 109. Specifically in FIG. 2, N is equal to three wherein three SID bit positions 102, 104, and 106 are specifically illustrated in FIG. 2.

The completion unit 24 contains L entries wherein L is a finite positive integer. FIG. 2 specifically illustrates that L equals eight wherein the completion unit 24 contains eight entries numerically labeled from zero to 7. While FIG. 2 shows eight completion unit entries, it should be understood that any number of entries (even one entry) may be implemented depending upon the design requirements of the system. In a manner similar to the instruction buffer 20, each entry in the completion unit 24 contains a valid (V) bit 110, N stream identifier (SID) bits 118 where N is a finite positive integer, and an instruction information field 119. Specifically, as discussed above with respect to the instruction buffer 20, N is equal to three in FIG. 2 whereby the completion unit 24 contains three SID bit positions labeled as bit positions 112, 114, and 116.

The branch prediction unit (BPU) 28 of FIG. 1 contains N branch prediction buffers. In FIG. 2, as previously discussed, N is equal to three whereby the BPU 28 contains three branch prediction buffers labeled as buffers 28a, 28b, and 28c. The contents of the branch prediction buffers 28a–28c are controlled by a branch control circuit 29 illustrated within the branch prediction unit (BPU) 28 of FIG. 2. The branch prediction buffer 28a contains a valid (V) bit 120, two (i.e., N−1) age bits 122 and 124, and an instruction information field 126. Generally, each branch prediction buffer 28a–28c in FIG. 2 will contain N−1 age bits wherein N−1 equals two in the embodiment specifically illustrated in FIG. 2. The branch prediction buffer 28b in FIG. 2 contains a valid (V) bit 130, two (i.e., N−1) age bits 132 and 134, and an instruction information field 136. In a like manner, branch prediction buffer 28c also contains a valid (V) bit 140, two age bits 142 and 144, and an instruction information field 146.

The specific functional use of the various fields illustrated in FIG. 2 will be specifically illustrated by example in subsequent FIGS. 3 through 10.

Figure 3:
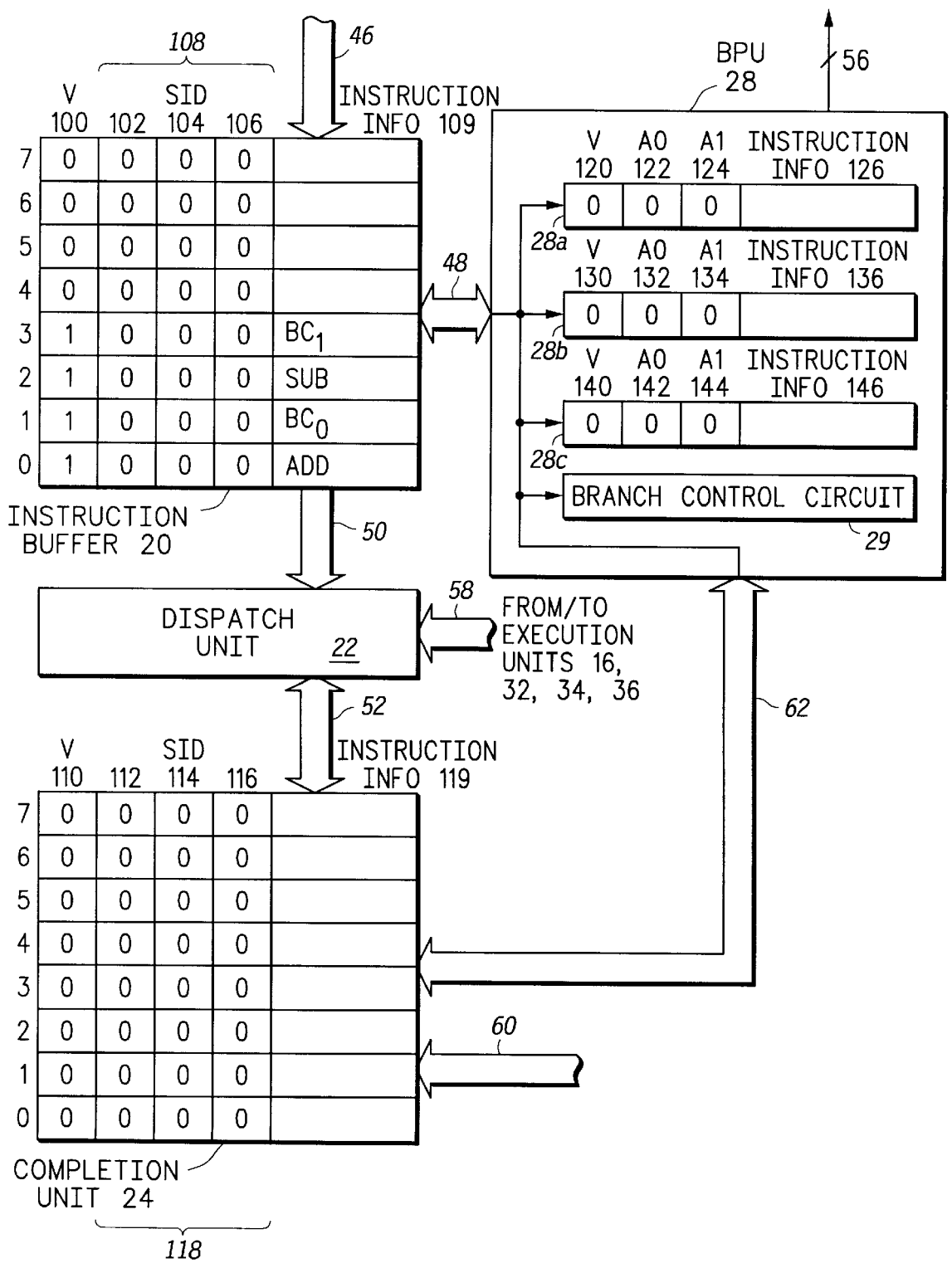
FIG. 3 illustrates, in a block diagram, the system of FIG. 2 after initialization operations and initial instruction prefetching has occurred in accordance with the present invention.

FIG. 3 illustrates the effect of system initialization on the structures of FIG. 2 followed by a prefetch of a group of computer instructions into the instruction buffer 20. In an empty state or after system initialization, all the valid (V) bits 100 of the instruction buffer 20 are cleared. In addition, all the SID bits 108 in the instruction buffer 20 are also cleared. Initially, any data stored within the instruction information fields 109 of the instruction buffer 20 is irrelevant (i.e., the information is "don't care" due to the cleared valid bits). In an empty state or after initialization, the valid bits 110 in the completion unit 24 are also cleared for all entries. The SID bits 118 in the completion unit 24 are also all set to a cleared state. In addition, the instruction information 119 within each entry of the completion unit 24 is irrelevant (i.e., "don't cares"). In an empty state or after system initialization, the valid bits 120, 130, and 140 within the branch prediction unit (BPU) 28 are cleared. All age bits 122, 124, 132, 134, 142, 144 within the branch prediction buffers 28a–28c within the BPU 28 are also initially cleared as illustrated in FIG. 3.

After the empty state is achieved or after system initialization is complete, FIG. 3 illustrates that four instructions are fetched from the I cache 18 to the instruction buffer 20 through the bus 46 under control from the fetch unit 26. While FIG. 3 illustrates that fetching from the I cache 18 to the instruction buffer 20 occurs in groups of four instructions, any number of instructions (i.e., one instruction, three instructions, ten instructions, etc.) may be read in a prefetch group/block from the I cache 18 to the instruction buffer 20. The timing and control of the instruction buffer prefetching may also vary significantly from system to system. Instruction buffer 20 illustrates that the four prefetched instructions are placed within the numerically ordered entries of the instruction buffer in a numeric order based upon their program order. In other words, the ADD instruction in FIG. 3 is first in the program order and is therefore placed in entry 0 of instruction buffer 20. The ADD instruction is followed in program order by a conditional branch ($BC_0$) which is placed in entry 1 of the instruction buffer 20. This conditional branch ($BC_0$) is followed in program order by a subtract (SUB) instruction placed in entry 2 of the instruction buffer 20. Finally, the fourth instruction, which is a conditional branch instruction $BC_1$, is placed within the instruction buffer 20 within the location/entry 3 in the instruction buffer 20. Since four instructions were placed in the lowest four entries within the instruction buffer 20, the valid bits 100 within the entries 0 through 3 of the instruction buffer 20 are set to indicate valid data is located within these first four entries.

Figure 4:
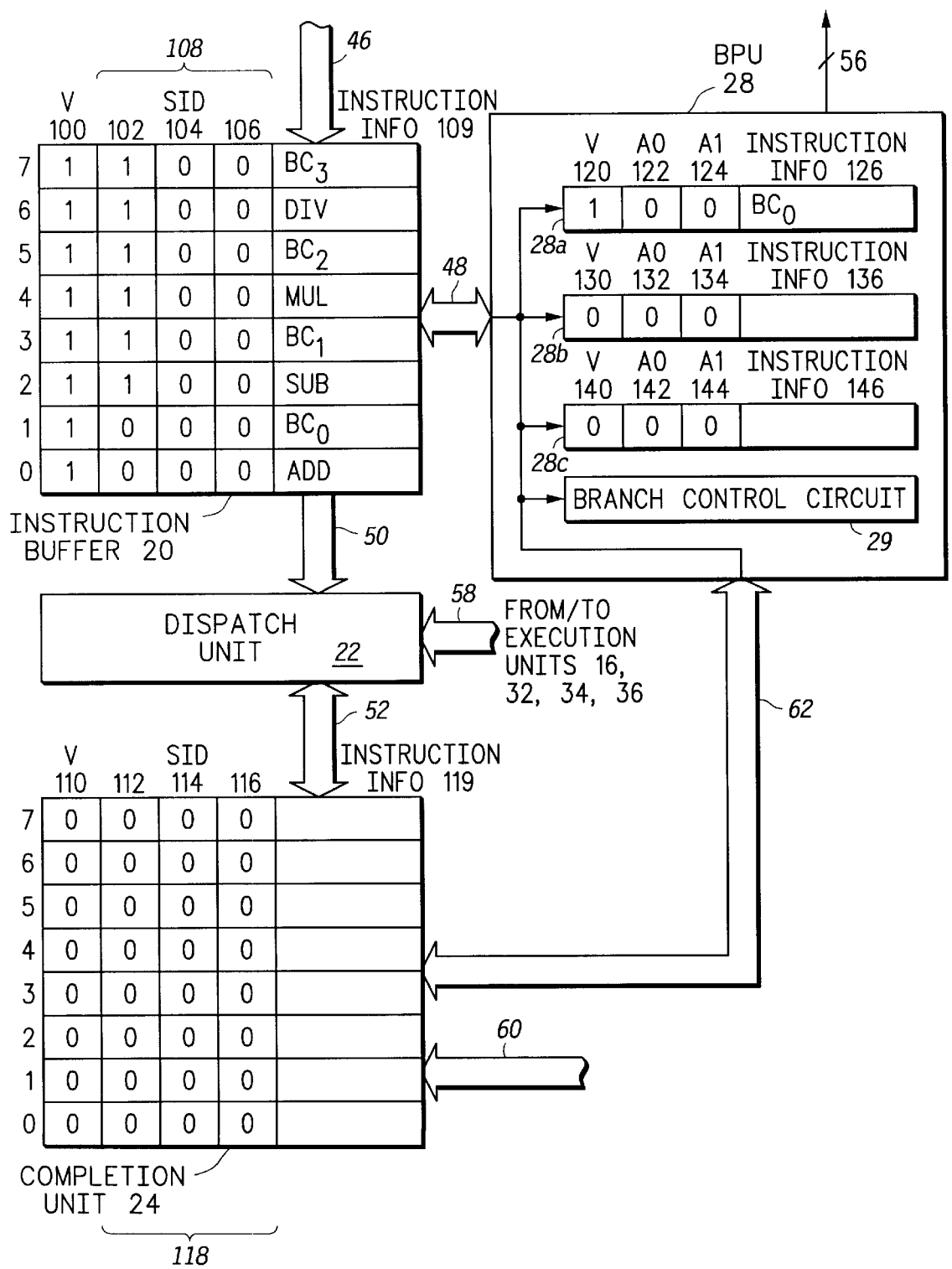
FIG. 4 illustrates, in a block diagram, how the system of FIG. 3 would predict a first branch instruction in accordance with the present invention.

FIG. 4 illustrates the effect, on the state illustrated in FIG. 3, of an additional fetch of four instructions from the I cache 18 into the instruction buffer 20 and the prediction of the branch instruction $BC_0$ by the BPU 28. FIG. 4 illustrates that four more instructions are fetched and placed, in accordance with their program order, into four consecutive entries of the instruction buffer 20. Accordingly, the valid (V) bits 100 for these four new entries 4–7 are set to logic 1 to indicate valid instructions are now stored within these entries 4–7 of the instruction buffer 20.

In addition, control logic (not specifically shown in FIG. 4) within the instruction buffer 20 determines that entry 1 of the instruction buffer 20 contains a branch instruction ($BC_0$). This information is communicated to the branch prediction unit (BPU) 28 via the bus 48. Once the BPU 28 is informed of the branch instruction $BC_0$, the branch control circuit 29 first determines whether or not the branch instruction BCo is an unresolved branch. If the instruction $BC_0$ is an unresolved branch instruction, then the branch prediction unit 28 must predict the direction (e.g., "branch taken" or "branch not taken") of the branch instruction $BC_0$. In FIG. 4, the branch instruction $BC_0$ is an unresolved branch that is predicted as being not taken. Due to this prediction, the instruction $BC_0$ is assigned to one of the unused branch prediction buffers 28a through 28c in the BPU 28. In the example of FIG. 4, since FIG. 3 is an empty state or after initialization, none of the branch prediction buffers 28a through 28c in the BPU 28 were in use prior to the receipt of the $BC_0$ information. Therefore, any one of the buffers 28a through 28c could be selected and assigned to the branch instruction $BC_0$ by the control circuit 29. In FIG. 4 it is illustrated that the branch prediction buffer 28a has been assigned to the instruction $BC_0$, however, it is important to note that a different register allocation scheme may be implemented within the circuit 29 which result in $BC_0$ being assigned to another buffer 28b or 28c.

In response to the instruction $BC_0$ being assigned to the buffer 28a, the valid (V) bit 120 of the buffer 28a in FIG. 4 is asserted to an active state. In addition, in order to properly preserve the age of the respective registers 28a through 28c, the valid (V) bit 130 from buffer 28b is copied into the age bit 122 of buffer 28a, and the valid (V) bit 140 from register 28c is copied into the age bit 124 of register 28a. Since the valid (V) bits 130 and 140 are zero or deasserted, the resulting bits 122 and 124 in buffer 28a will be zero or deasserted as in FIG. 4. This 00 state of the A0:A1 bits in buffer 28a of FIG. 4 ensures that the current contents of buffer 28a is identified as being older than any subsequent information that may be placed into buffers 28b and 28c in later BPU operations while $BC_0$ is still active.

The branch prediction unit (BPU) 28, via the branch control circuit 29, communicates over bus 48 to the instruction buffer 20 that the branch instruction $BC_0$ has been assigned to buffer 28a within the BPU 28. In response to this communication, the instruction buffer 20 sets the SID bit position 102 for all instructions within the instruction buffer 20 that occur after the $BC_0$ instruction in program order. If an instruction precedes the $BC_0$ instruction in program order, the execution of this instruction is not directly dependent upon the correct or incorrect prediction of $BC_0$ instruction. These instructions that precede $BC_0$ (i.e., instruction ADD in entry 0 of buffer 20) are identified as such via a SID value of zero within SID bit position 102. However, if an instruction follows the $BC_0$ instruction in program order (i.e., the instruction is in a higher numbered entry within the instruction buffer 20 such as entries 2–7 in buffer 20), then the proper execution of this instruction is directly dependent upon whether or not the prediction of $BC_0$ instruction by the BPU 28 was correct or incorrect. These instruction that follow $BC_0$ in program order within the buffer 20 are identified as such via a SID value of one within SID bit position 102. In addition, the $BC_0$ instruction itself is flagged with a SID value of zero within SID bit position 102. Therefore, the bit position 102 within the SID bits 108 buffer 20 of FIG. 4 are associated with the branch prediction buffer 28a in the BPU 28 of FIG. 4.

Figure 5:
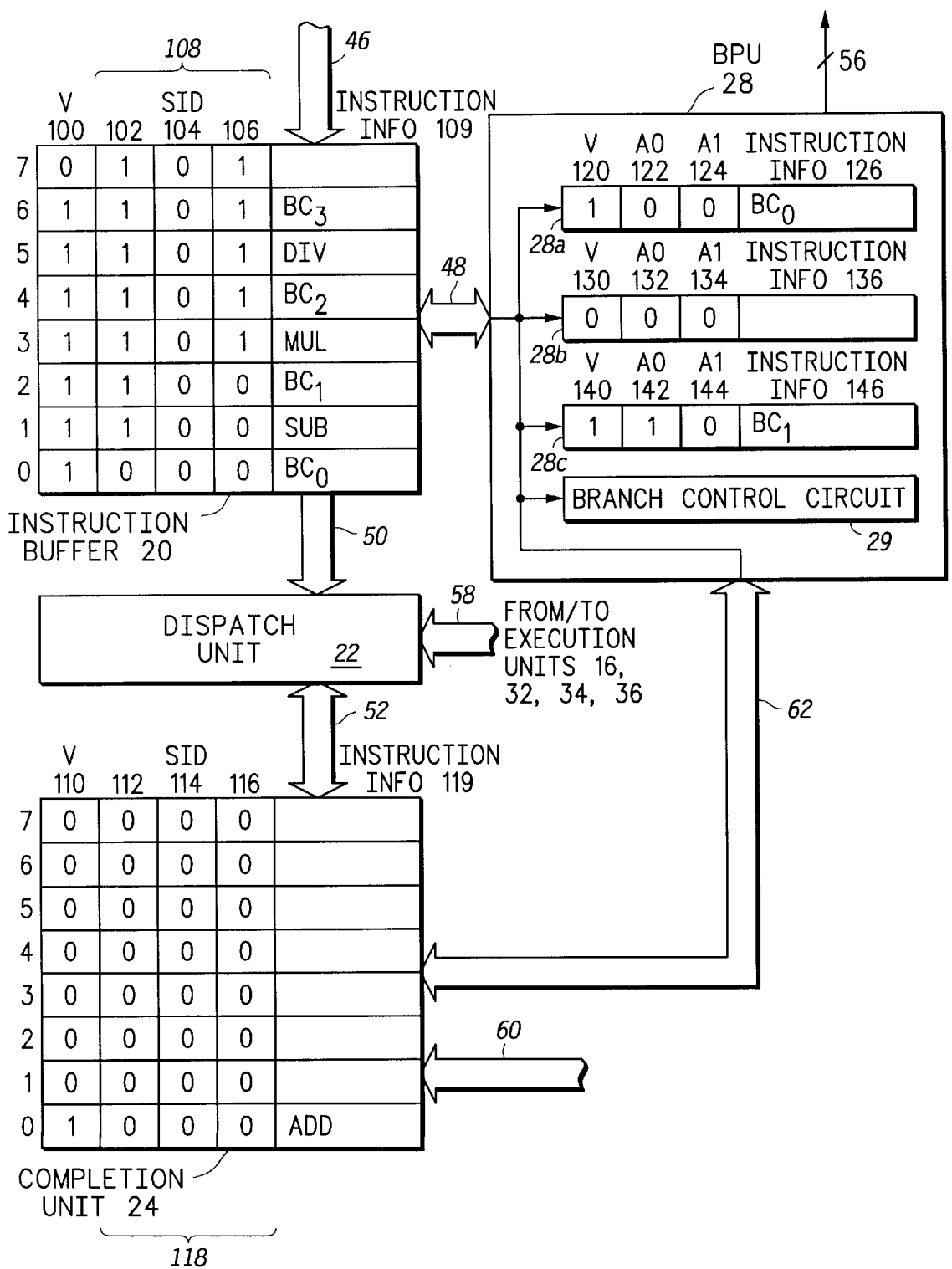
FIG. 5 illustrates, in a block diagram, how the system of FIG. 4 would predict a second branch instruction in accordance with the present invention.

FIG. 5 continues the example previously illustrated using FIGS. 3–4 from the state illustrated in FIG. 4. FIG. 5 generally illustrates the effect of the dispatch of the ADD instruction and the prediction of the branch instruction $BC_1$, on the state previously illustrated in FIG. 4. In FIG. 5, the ADD instruction is dispatched from the instruction buffer 20 to the completion unit 24 via the dispatch unit 22 and the busses 50 and 52. Since the ADD instruction has been dispatched out of the instruction buffer 20, all of the instructions ($BC_0$, SUB, . . . DIV, and $BC_3$) presently stored within the instruction buffer 20 are decremented to the next lower storage entry within the instruction buffer 20. In other words, the operation of the buffer 20 is first-in-first-out (FIFO) in nature. All of the valid (V) bits 100, the SID bits 108, and the instruction information fields 109 (which contain system information about the respective stored instructions) are also decremented accordingly when an instruction is dispatched from the instruction buffer 20. The entry 7 of the instruction buffer 20 is invalidated by writing a deasserted state into the valid (V) bit 100 due to the ADD dispatch and decrement operation previously discussed. The ADD instruction, which is dispatched from the instruction buffer 20, is assigned to the lowest available location/entry 0 within the completion unit 24. Therefore, the completion unit 24 illustrates that the ADD instruction has been added to entry 0 within the completion unit 24 whereby the valid (V) bit 110 of entry 0 in the unit 24 has been asserted to a logic one. In addition, the SID bits 102-106 associated with the ADD instruction are also copied from instruction buffer 20 through the dispatch unit 22 to the completion unit 24 and placed into the ADD entry 0 of the unit 24.

In addition to the dispatch of the ADD instruction in FIG. 5, FIG. 5 illustrates the branch prediction processing of the branch instruction $BC_1$. The instruction buffer 20 identifies to the BPU 28 via the bus 48 that a branch instruction $BC_1$, resides in entry 2 of the instruction buffer 20. The branch control circuit 29 processes this branch instruction $BC_1$ and determines that this instruction is an unresolved branch. In addition, this unresolved branch is predicted as being not taken by the circuit 29, and is assigned to one of the two of the unused branch prediction buffers 28b and 28c in FIG. 5. Specifically, FIG. 5 illustrates that the branch instruction $BC_1$, is assigned to the branch prediction buffer 28c (i.e., out of order buffer 28a–28c is possible and advantageous in the architecture of FIGS. 1–11). In response to assigning the buffer 28c to the instruction $BC_1$, the valid (V) bit 140 within the buffer 28c is set to an asserted state. In addition, the valid (V) bit 120 of the buffer 28a is copied to the age bit 142 of the buffer 28c, and the valid (V) bit 130 of buffer 28b is copied to the age bit 144 of buffer 28c. The binary value 10 within the age bits A0:A1 of FIG. 5 indicates that the contents within the buffer 28c are newer than the contents located within the buffer 28a.

The branch control circuit 29 communicates via the bus 48 to the instruction buffer 20 that the instruction buffer 28c has been assigned to the instruction $BC_1$. In response to the communication of this assignment, all SID bits 106 within instruction buffer 20 which are greater in program order than the instruction $BC_1$, are asserted in the instruction buffer 20 as shown in FIG. 5.

Figure 6:
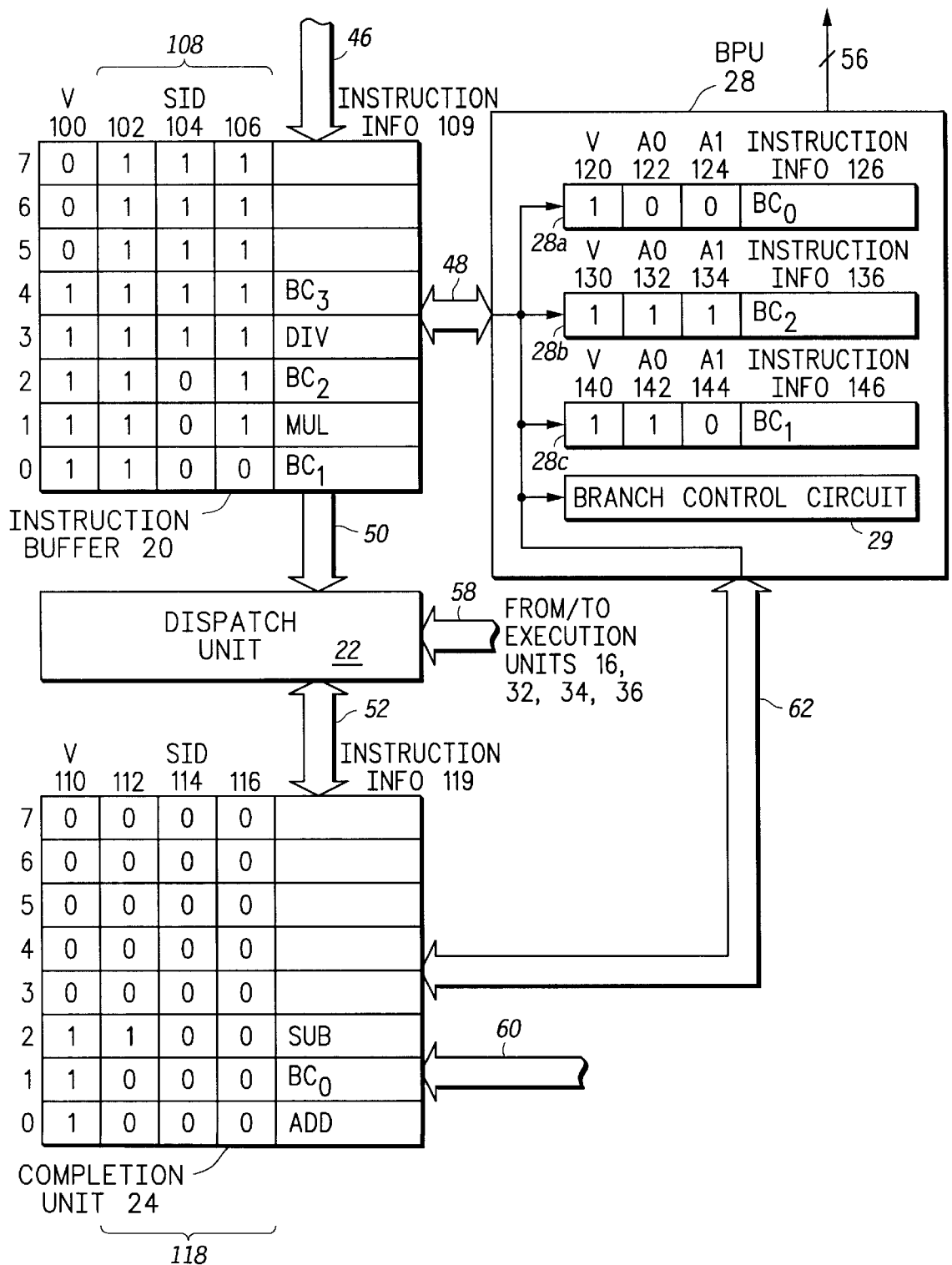
FIG. 6 illustrates, in a block diagram, how the system of FIG. 5 would predict a third branch instruction in accordance with the present invention.

FIG. 6 continues with the example previously shown in FIGS. 3–5. FIG. 6 specifically illustrates the effects of dispatching $BC_0$, dispatching the subtract (SUB) instruction, and predicting the branch instruction $BC_2$ after the state of FIG. 5 is obtained. FIG. 6 illustrates that the branch instruction $BC_0$ and the SUB instruction are moved from the instruction buffer 20 to the completion unit 24. In addition to a movement of the instruction information 109 to field 119 for the SUB and $BC_0$ instructions, the SID bits 112–116 for the two dispatched instructions SUB and $BC_0$ are also copied from the instruction buffer 20 to the respective entries 1–2 within the unit 24. In addition, the valid (V) bits 110 for the entries 1 and 2 within the completion unit 24 are set to indicate valid instruction data within the entries 1 and 2 of the unit 24. In response to the dispatch of the two instructions SUB and $BC_0$, all remaining entries $BC_1$, MUL, . . .

$BC_3$, within the instruction buffer 20 are moved down or decremented two entries within the instruction buffer 20. In addition to this instruction information 109 being moved, the valid (V) bits 100 and the SID bits 108 are also moved down two positions within the instruction buffer 20 so the data in the instruction buffer is properly spatially associated. In response to the dispatch of two instructions SUB and $BC_0$, the top three valid (V) bits within entries 5–7 of the instruction buffer 20 are cleared meaning that the bits 102–106 and information 109 for these entries 5–7 of buffer 20 within FIG. 6 are "don't care" values.

The instruction buffer 20 communicates to the branch prediction unit (BPU) 28 that a branch instruction $BC_2$ resides within entry 2 of the instruction buffer 20. The branch control circuit 29 processes this branch instruction $BC_2$ and determines that this branch instruction is an unresolved branch. In FIG. 6, the branch $BC_2$ is predicted as not taken and is assigned the only unused branch prediction buffer 28b remaining within the branch prediction unit 28. The instruction information 136 of buffer 28b is therefore written to contain information about the branch instruction $BC_2$, and the valid (V) bit 130 of the buffer 28b is set in FIG. 6. In addition, the valid (V) bit 120 of buffer 28a is copied into the age bit 132 of buffer 28b, and the valid (V) bit 140 of buffer 28c is copied into the age bit 134 of buffer 28b in FIG. 6. Since both age bits 132 and 134 are set within the branch prediction buffer 28b creating an A0:A1 binary state of 11, the contents of 28b are properly marked as being newer than both of the contents located within registers 28a and 28c. In addition, the branch control circuit 29 communicates to the instruction buffer 20 that the buffer 28b has been assigned to the branch instruction $BC_2$. In response to this communication, all the SID bits 104 which lie above the branch instruction $BC_2$ in program order within the instruction buffer 20 are set by control circuitry within the instruction buffer 20.

Figure 7:
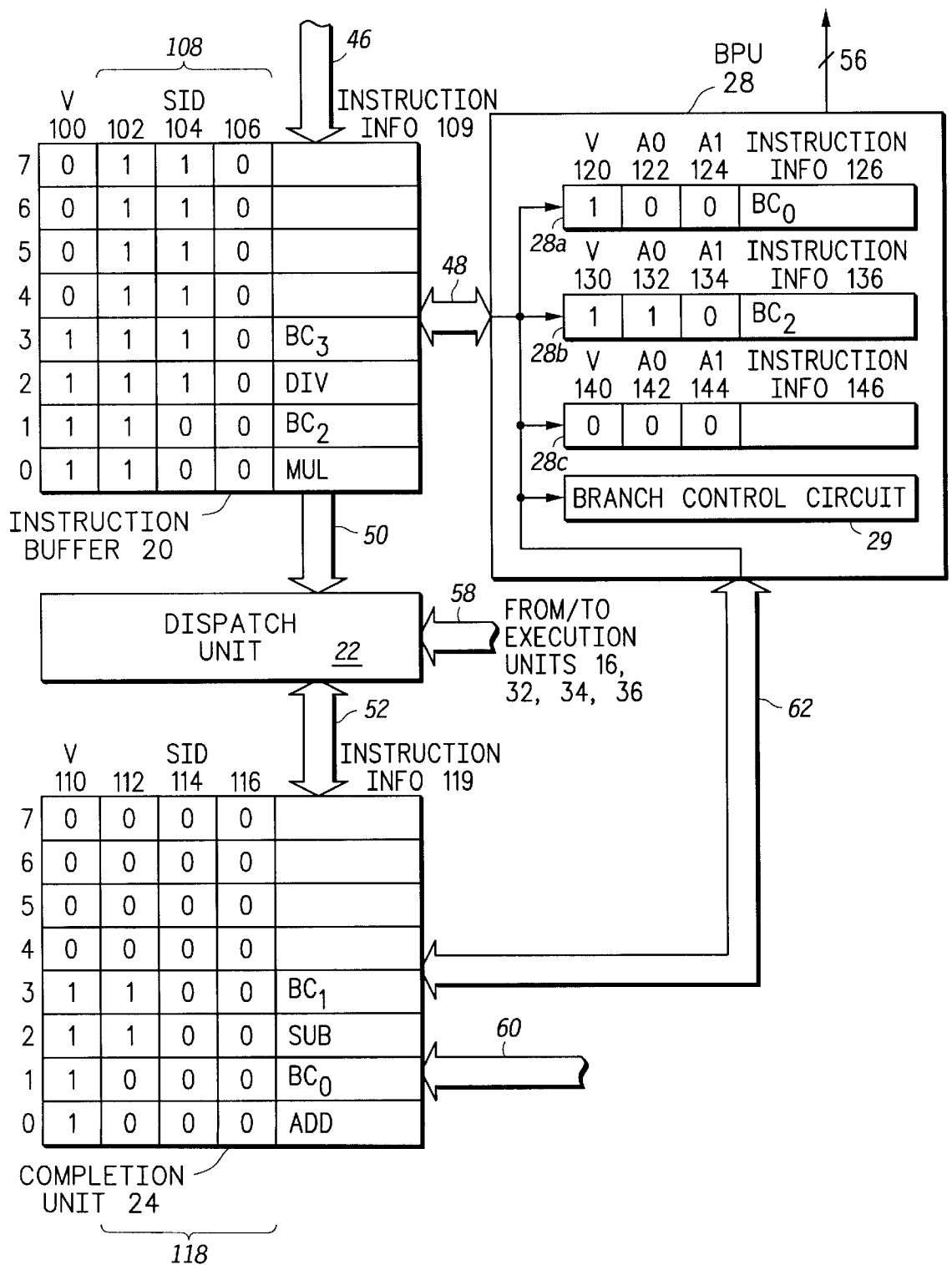
FIG. 7. illustrates, in a block diagram, how the structure of FIG. 6 is used to resolve one correctly-predicted branch in accordance with the present invention.
Figure 8:
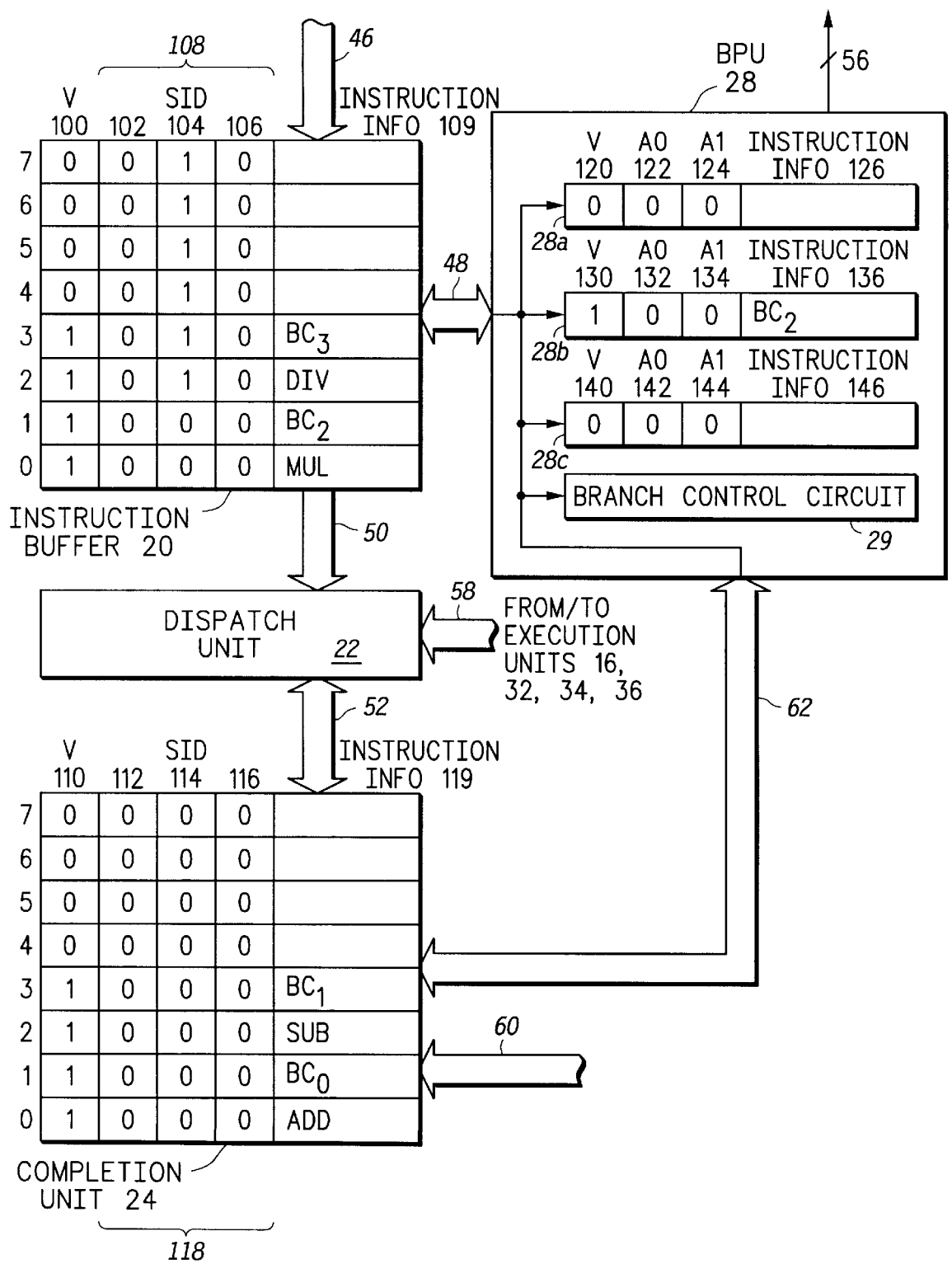
FIG. 8. illustrates, in a block diagram, how the system of FIG. 6 would resolve multiple correctly-predicted branches in parallel with one another in accordance with the present invention.
Figure 9:
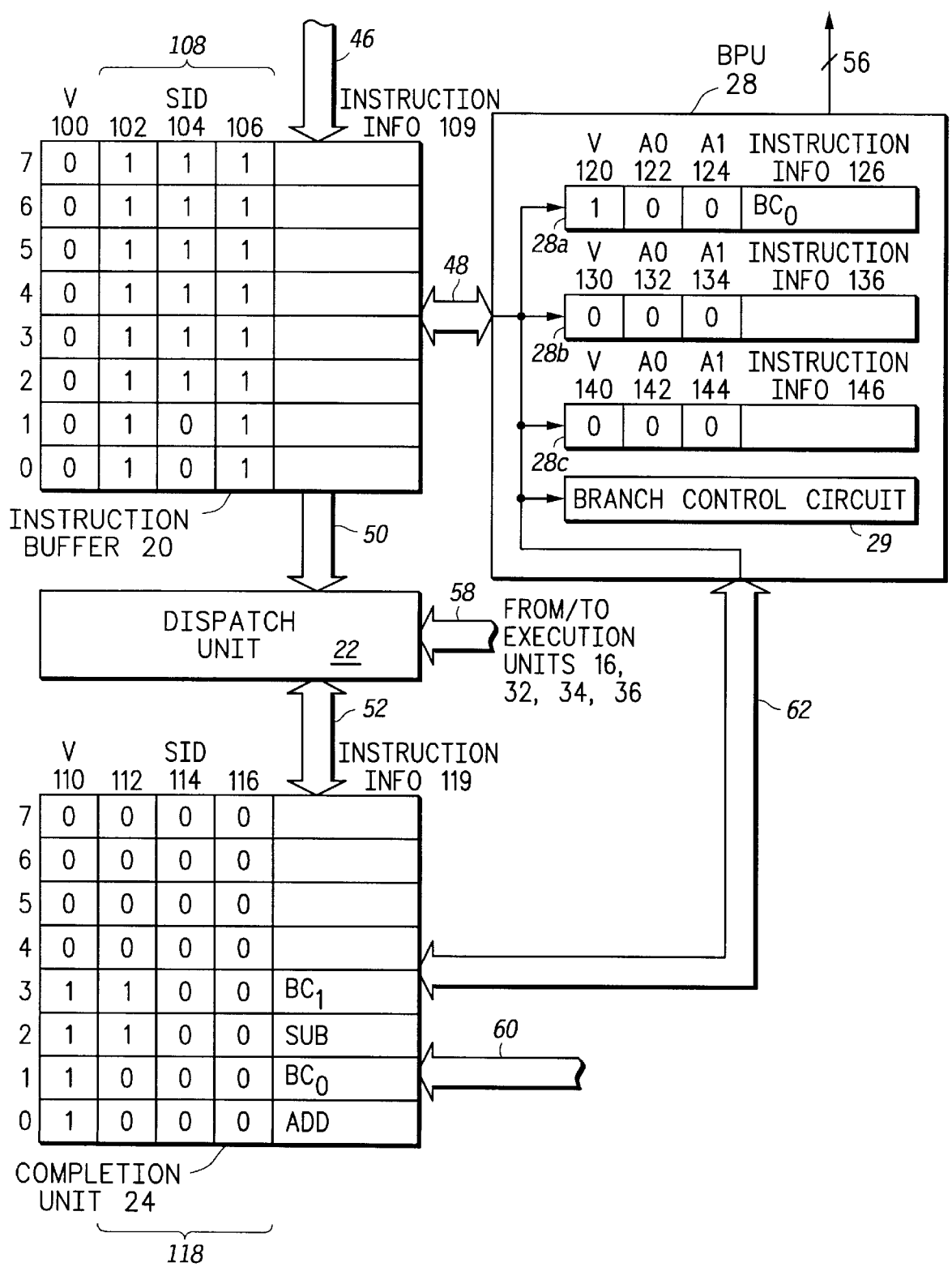
FIG. 9. illustrates, in a block diagram, how the system of FIG. 6 would recover from a single mispredicted branch in accordance with the present invention.

FIG. 6 is a good starting state which can be used to efficiently illustrate four potential next states that may occur from the state shown in FIG. 6. FIG. 7 will illustrate how the state of FIG. 6 is affected by the resolution of a single branch instruction (e.g., $BC_1$) as being correctly predicted. FIG. 8 will illustrate, from the state of FIG. 6, how the state of FIG. 6 is affected by the simultaneous resolution of two or more branch instructions (e.g., $BC_0$ and $BC_1$) as being correctly predicted by the BPU 28. FIG. 9 will illustrate, from the state of FIG. 6, how the state of FIG. 6 is affected by the determination that a single branch instruction (e.g., $BC_1$) has been mispredicted by the BPU 28. Finally, FIG. 10 will illustrate, from the state of FIG. 6, how the state of FIG. 6 is affected by the simultaneous or overlapping determination that two or more branch instructions (e.g., $BC_0$ and $BC_1$) have been mispredicted by the BPU 28. Other examples exist, however, these examples may be easily understood from the contents of FIGS. 6–10. For example, a simultaneous resolution of a correctly predicted branch and a mispredicted branch may occur. In this circumstance, the process of FIG. 7 and FIG. 9 are performed either in parallel with each other or within adjacent clock cycles to retire the correctly predicted branch while also recovering from the mispredicted branch.

FIG. 7 illustrates the effect of a branch $BC_1$ dispatch and the resolution of the branch instruction $BC_1$ as being correctly predicted on the state previously illustrated in FIG. 6. First, the branch instruction $BC_1$ is dispatched from the instruction buffer 20 to the completion unit 24. The detailed effects of the dispatch operations were previously discussed in FIGS. 4–6 and will no longer be specifically detailed in subsequent FIGS. 7–10. In addition to the dispatch of $BC_1$, the completion unit 24 has provided information over the bus 62 to the BPU 28 to allow the branch control circuit 29 to perform branch resolution. In this specific example, the information provided via bus 62 allows the branch control circuit 29 to resolve the branch instruction $BC_1$ within the buffer 28c of the BPU 28. In this example, the instruction $BC_1$ was correctly predicted which results in the valid (V) bit 140 of buffer 28c being cleared, and the A0 and A1 age bits 142 and 144 of buffer 28c also being cleared. In response to the removal of the $BC_1$ information from buffer 28c, information from the BPU 28 is communicated over the bus 62 to allow the SID bits 116 within the completion unit 24 to be cleared. In addition, information is communicated over the bus 48 from the control circuit 29 to enable the SID bit 106 within the instruction buffer 20 to be cleared. The removal of the $BC_1$ information from the buffer 28c results in the age bit 134 of buffer 28b being cleared as illustrated in FIG. 7. Additionally, the bit 124 in FIG. 7 is also cleared in buffer 28a, although this does not create a change of logic state. In other words, once the state of a buffer 28a–28c changes, the valid bit of this changed buffer is copied over into the other two buffers to ensure the age bits are current and accurate.

Generally, the branch prediction process shown in FIGS. 7–8 and may be conceptualized by introducing the term "instruction stream". Instruction streams are program order sequential streams of instructions bounded by branch instructions. Each conditional branch instruction in a computer program splits the program's instruction flow into two streams. One instruction stream contains instructions that proceed the conditional branch instruction in program order, and the other instruction stream contain the instructions that follow the conditional branch instruction in instruction steam order. This property, where a conditional branch instruction splits an instruction stream into two adjacent but segmented streams, means that if there are N branch instructions in a computer program, there are N+1 instruction streams as illustrated below:

stream 1 . . . $BC_0$. . . stream 2 . . . $BC_1$ . . . stream 3 . . . $BC_2$ . . . stream 4

Each stream is bounded by either the start of the program and a conditional branch instruction, a conditional branch instruction and the end of the program, or two conditional branch instructions. Therefore, the four branch instructions $BC_0$ through $BC_3$ in FIG. 4 would create five streams of instructions. Streams of instructions are important conceptualizations in branch prediction since once the branch that precedes or begins the instruction stream is correctly predicted, the entire stream of instructions that follows is ensured execution by the CPU. In a similar manner, if a branch is mispredicted, the streams that follow the mispredicted branch are not guaranteed executed. Instead, these following instructions are canceled from execution whereby a recovery process is initiated to find the correct stream to execute. Therefore, keeping track of "streams" may enable simpler branch resolution and misprediction correction.

Given this concept of a "stream", it is now easy to understand why the bits 108 and 118, in FIG. 6 for example, are called stream identifier (SID) bits. Collectively, the bits 102–106 within a set of SID bits 108 mark the boundaries of various instruction streams in an efficient manner. Therefore, in FIG. 6 for example, the SID bits 108 and 118 contain logic values 000 (see entry 0 of unit 24 in FIG. 6 for example), logic values 100 (see entry 2 of unit 24 in FIG. 6 for example), logic values 101 (see entry 1 of buffer 20 in FIG. 6 for example), and logic values 111 (see entry 4 of unit 24 in FIG. 6 for example). Each of these SID states 000, 100, 101, and 111 mark a stream of instructions bounded by branches.

Due to the concept of "streams" which is embodied in the SID bits of FIGS. 2–10, the removal of a branch from the BPU 28 due to a correct prediction as in FIG. 7 may be viewed as the merging of two streams of instructions. The removal of the unresolved branch $BC_1$ from the branch prediction unit 28 has merged all of the instructions subtract (SUB), $BC_1$, multiply (MUL), and $BC_2$ from two instruction streams (previously SID tagged as 100 and 101 respectively in FIG. 6) into one contiguous instruction stream being SID tagged as 100 in FIG. 7. In other words, the branch algorithm shown via FIGS. 6–7 has resolved the branch $BC_1$ as correctly predicted whereby two streams may now be merged as one stream and executed as a contiguous unit of sequential instructions without worry of branch complications.

FIG. 8 illustrates the effect, on the state of FIG. 6, of a $BC_1$ dispatch followed by the resolution of the branch instructions $BC_1$ and $BC_0$ as being correctly predicted. From FIG. 6, the instruction $BC_1$ located in entry 0 of FIG. 6 is dispatched in FIG. 8 from the instruction buffer 20 to the completion unit 24. Over time, information is eventually communicated from the completion unit 24 to the branch control circuit 29 via the bus 62. Assume that this information now enables the branch control circuit 29 to determine that the branch instruction $BC_0$ and the $BC_1$ were correctly predicted in the branch prediction unit 28. Because of this dual correct prediction, both the valid (V) bits 120 and 140 are cleared in buffers 28a and 28c and the age bits 122, 124, 142, and 144 are also cleared in the buffers 28a and 28c. The clearing of the valid (V) bit 120 results in the clearing of the age bit 132 in buffer 28b, and the clearing of the valid (V) bit 140 will result in the clearing of the age bit 134 in FIG. 8. This correction of age bits will ensure that $BC_2$ is properly identified in FIG. 8 as the oldest information within the buffers 28a–28c of the BPU 28.

In response to clearing of the buffers 28a and 28c in FIG. 8, information is communicated over the bus 62 to clear the SID bits 112 and 116 within completion unit 24. In addition, the branch control circuit 29 communicates information over the bus 48 to clear the SID bits 102 and 106 in the instruction buffer 20 as shown in FIG. 8. The clearing of these SID bits results in the merging of three instruction streams whereby the ADD, BCO, subtract (SUB), $BC_1$, multiply (MUL), and $BC_2$ instructions are now merged in FIG. 8 to form a single contiguous instruction stream. Since the $BC_2$ instruction remains unresolved within the branch prediction unit 28, a second instruction stream containing the instructions divide (DIV) and $BC_3$ in FIG. 8 will remain as identified by the SID bits 104. In other words, the four instruction streams SID tagged as 000, 100, 101, and 111 in FIG. 6 are now merged into only two streams, tagged as 000 and 010 in FIG. 8, through the occurrence of the dual correct prediction of $BC_1$ and $BC_0$ in FIG. 8.

FIG. 9 illustrates the effect of a $BC_1$ dispatch and a $BC_1$ mispredict on the state previously shown in FIG. 6. First, the $BC_1$ instruction from FIG. 6 is dispatched from the instruction buffer 20 to the completion unit 24 in FIG. 9. Information is then communicated from the completion unit 24 to the branch control circuit 29 by the bus 62. This information allows the branch control circuit 29 to determine that the branch instruction $BC_1$ was mispredicted by the BPU 28. Since the instruction $BC_1$ was mispredicted, the valid (V) bit 140 of buffer 28c is cleared and the age bits 142 and 144 are also cleared in response to the valid (V) bit 140 being cleared. By inspection of the age bits A0 and A1 in the BPU 28, it is determined by the branch control circuit 29 that the information stored within buffer 28b is newer than the information stored in buffer 28c. By virtue of this age relationship, the information in 28b must also be cleared due to the misprediction of the branch $BC_1$. In other words, branches that follow a mispredicted branch in program order must also be cleared with the mispredicted branch. Therefore, the $BC_2$ instruction is cleared from the buffer 28b by clearing the valid bit 130 and the age bits 132 and 134 as shown in FIG. 9. The clearing of the valid bits 130 and 140 results in the clearing of the age bits 122 and 124 in FIG. 9.

The branch control circuit 29 communicates information over the bus 62 which results in the completion unit 24 checking to see if any SID bits 116 within the completion unit 24 are set. Since no SID bits 116 are set in the completion unit 24, no instructions need to be flushed from the completion unit 24 in response to the $BC_1$ misprediction in FIG. 9. Therefore, no valid (V) bits 110 in the completion unit 24 are affected in FIG. 9. In addition, the branch control circuit 29 communicates information over the bus 48 whereby the instruction buffer 20 checks to determine if any SID bits 106 are asserted in the instruction buffer 20. All of SID bits 106 that are asserted are invalidated in the instruction buffer 20 by clearing the valid (V) bits 100 that are associated with all of the set SID bits 106. In this case, all the bits 106 within the buffer 20 are set in FIG. 6 whereby all the valid bits 100 in the instruction buffer 20 are invalidated due to the misprediction of $BC_1$. However, in another example, only a portion of the valid (V) bits 100 in the instruction buffer 20 and/or the unit 24 may be cleared. Generally, this valid (V) bit clearing operation performed in the unit 24 and the buffer 20 purges from execution all instructions in the CPU that are associated with streams adversely affected by the misprediction of $BC_1$.

In addition, a mispredict recovery address is communicated by the circuitry 29 to the fetch unit 26 (see FIG. 1) via the bus 56 in FIG. 9. Since only one instruction is mispredicted in the example of FIG. 9, only a mispredict recovery address associated with the instruction $BC_1$ needs to be communicated over the bus 56. The fetch unit 26 of FIG. 1 will use this mispredict recovery address in order to redirect instruction flow along a correct instruction stream.

Figure 10:
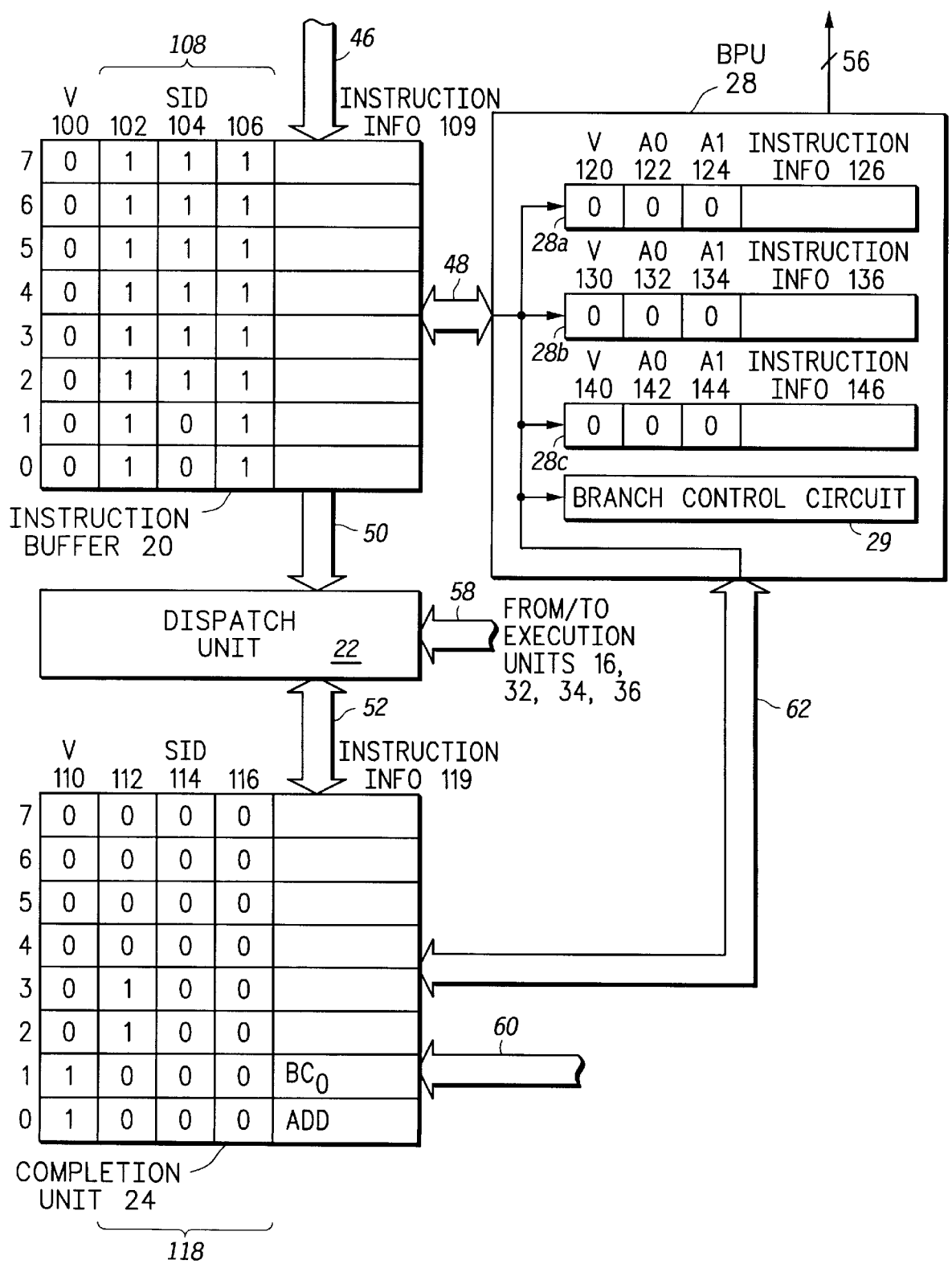
FIG. 10 illustrates, in a block diagram, how the system of FIG. 6 would recover from multiple mispredicted branches in accordance with the present invention.

FIG. 10 illustrates the effect, on the state shown in FIG. 6, of a $BC_1$ dispatch along with a $BC_1$ and $BC_0$ misprediction in the BPU 28. In FIG. 10, the $BC_1$ instruction in the instruction buffer 20 of FIG. 6 is dispatched from the instruction buffer 20 to the completion unit 24. The completion unit 24 then communicates information over the bus 62 to the branch control circuit 29. Assume that the branch control circuit 29 uses this information to determine that both the $BC_1$ and $BC_0$ instructions were mispredicted by the BPU 28. By virtue of being mispredicted, both the valid (V) bits 120 and 140 of the buffers 28a and 28c are cleared in FIG. 10 and all of the age bits 122, 124, 142, and 144 are cleared for the buffers 28a and 28c in FIG. 10. Since the information stored in 28b is newer than both the information stored in 28a and 28c (i.e., the branch in buffer 28b follows, in program order, at least one mispredicted branch in one of buffer 28a or 28c), the valid (V) bit 130 and the age bits 132 and 134 are also cleared in FIG. 10. Therefore, the misprediction illustrated in FIG. 10 has caused all three branch prediction buffers 28a through 28c to be cleared in FIG. 10.

Due to the mispredictions in FIG. 10, the branch control circuit 29 communicates information over bus 62 to the completion unit 24. The completion unit 24, using this information, determines that the SID bits 112 are set for entries 2 and 3 of the completion unit 24. Since these SID bits 112 for entries 2 and 3 are set, the valid (V) bits 110 for entries 2 and 3 of the completion unit 24 are cleared. In addition, the completion unit 24 checks for asserted bits 116 and finds no asserted bits 116 in FIG. 10 and therefore clears no additional valid (V) bits in the completion unit 24. Furthermore, the branch control circuit 29 provides information over the bus 48 to the instruction buffer 20. This information allows the instruction buffer 20 to invalidate all valid (V) bits 100 that are associated with asserted bits 102 and/or asserted bits 106. As a result, all valid (V) bits 100 in entries 0-7 in the instruction buffer 20 are cleared as illustrated in FIG. 10.

In addition to clearing selective valid (V) bits in the buffer 20 and the unit 24, the branch control circuit 29 provides a branch recovery address over the bus 56 illustrated in FIG. 10. Since two mispredicted branches were encountered in the example of FIG. 10, the mispredict recovery address that is provided via the bus 56 is the mispredict recovery address associated with the oldest instruction which was mispredicted in FIG. 10. The oldest mispredicted branch is determined by utilizing the age bits 122, 124, 132, 134, 142, and 144. Specifically, the age bits A0 and A1 in FIG. 10 are inspected for the branch prediction buffers 28a and 28c that are assigned to instructions $BC_1$ and $BC_0$, whereby the age bits for the instruction $BC_0$ in buffer 28a indicate that the information for $BC_0$ is the oldest information which was mispredicted in the example of FIG. 10 (i.e., BCo information in the BPU 28 of FIG. 10 is older than the $BC_1$ information in the BPU 28 of FIG. 10). Therefore, recovery information for the instruction $BC_0$ is used to recover from the misprediction using the fetch unit 26 of FIG. 1.

While it is possible for each of the three unresolved branches in the BPU 28 to be resolved, each as one of either "correctly predicted" or "mispredicted" in a single cycle, these eight possible permutations and their respective affects on the merging or canceling of streams may be easily understood by combining the above basic examples in FIGS. 7–10. For example, what would occur in response to a double mispredict and a single correct branch resolution occurring at the same time would be a combination of the teachings of FIG. 7 and FIG. 10 occurring simultaneously or in close proximity by the control circuitry within the CPU.

Figure 11:
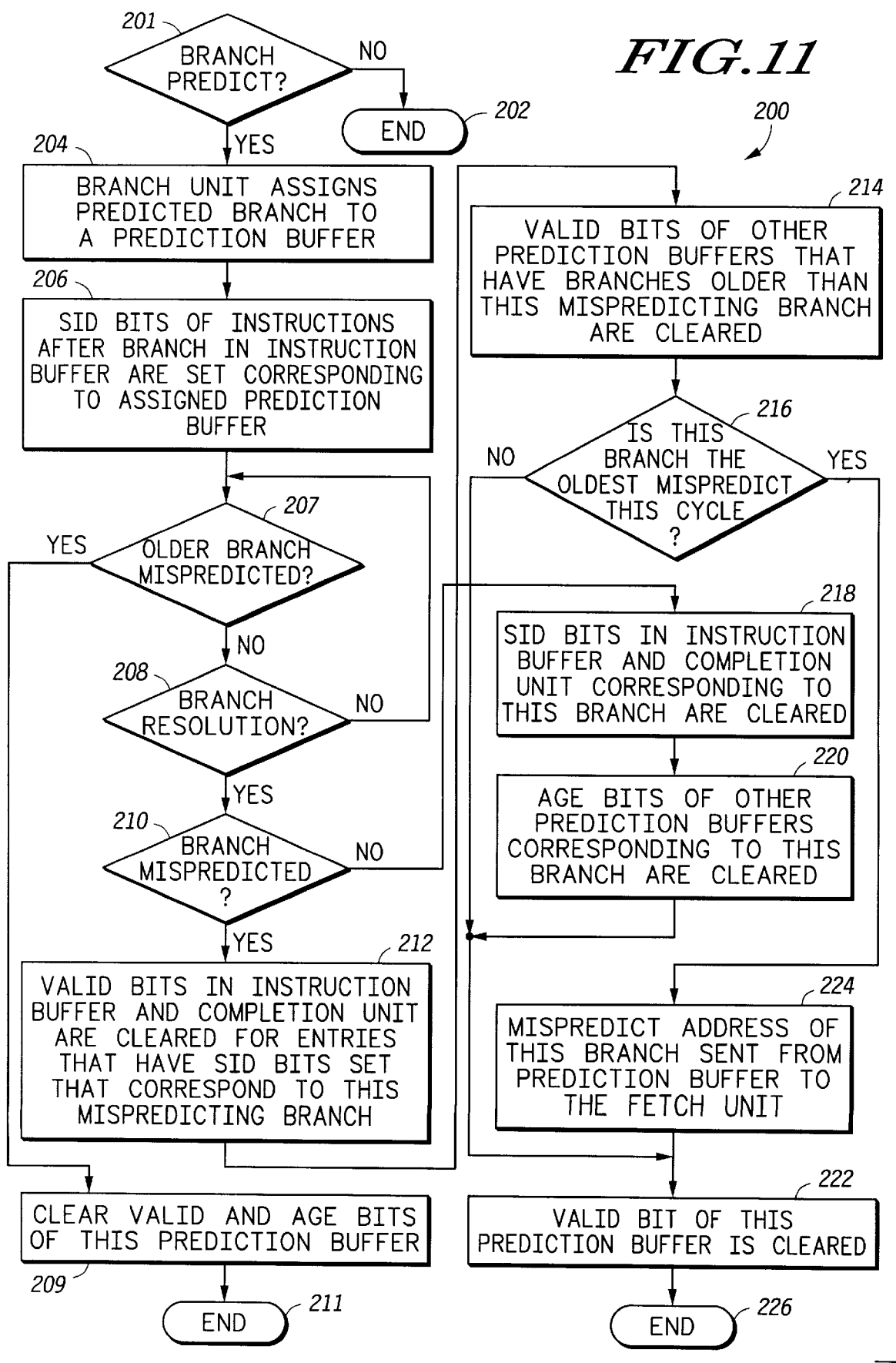
FIG. 11. illustrates, in a flow diagram, a method for performing branch prediction and resolution in accordance with the present invention.

FIG. 11 illustrates a flow diagram of the algorithm which is used to perform the branch prediction, branch resolution, and misprediction recovery previously described above with respect to FIGS. 1–10. Specifically, the methodology 200 begins by determining whether branch prediction is needed in a step 201. If the specific branch that is encountered is a resolved branch or if no branches are within the instruction buffer 20 for processing, then no branch prediction is needed by the BPU 28. Alternatively, the BPU 28 could be busy (e.g., all available prediction buffers could be filled), and thus the algorithm would be delayed until some later time when either the BPU 28 was not busy, or the instruction buffer 20 no longer required that the branch be processed. If no branch prediction is needed, the algorithm terminates via a step 202 where "terminating" in step 202 simply means that the algorithm of FIG. 11 is performed once again at a later time once branch prediction is determined to be needed by the CPU. If the branch in question is an unresolved branch, then branch prediction is needed in the BPU 28 and the algorithm continues with step 204 in FIG. 11. In a step 204, an unresolved branch is processed by the branch prediction unit (BPU) 28 whereby the branch prediction unit assigns the unresolved branch to one unused branch prediction buffer 28a–28c. This assignment of a branch instruction to a branch prediction buffer was previously illustrated three separate times in FIGS. 4, 5, and 6. After branch prediction buffer assignment is complete via step 204, a step 206 is performed.

In step 206, system identifier (SID) bits associated with computer instructions that follow the unresolved branch in program order are set within the instruction buffer 20. The SID bits that are set have a bit position that is structurally or programmably associated with the assigned prediction buffer determined in step 204. The setting of SID bits in an instruction buffer 20 after branch prediction buffer assignment is shown in each of FIGS. 4, 5, and 6. After step 206 in FIG. 11, a step 207 is performed. Step 207 determines if an older branch instruction than the instruction assigned in step 204 has been mispredicted. If an older branch has been mispredicted, then the contents of the prediction buffer in step 204 is inconsequential. For this reason, a step 209 clears the valid bits and age bits of the prediction buffer selected in step 204 if an older mispredicted branch is encountered. After the step 209, the algorithm terminates via a step 211 to await execution of the process of FIG. 11 over again for other branch instructions.

However, if no older branch is mispredicted as determined by the step 207 in FIG. 11, a step 208 is performed. In step 208, the branch control circuit 29 is awaiting information from bus 62, which is coupled to the completion unit 24, in order to resolve one or more specific branch operations stored within the branch prediction buffers 28a–28c. As long as no branches can be resolved in FIG. 11, the instructions 207 and 208 will be iteratively looped until resolution of the instruction or canceling of the instruction due to misprediction is possible. Once a branch can be resolved, as determined via step 208, the step 210 is performed. In step 210, the information received over the bus 62 is processed by the branch control circuit 29. If a determination is made in step 210 that the branch was correctly predicted, then the step 218 is performed.

In step 218, the SID bits in the instruction buffer 20 and the completion unit 24 corresponding to this correctly-predicted branch instruction are cleared. This clearing operation due to correct branch predictions in step 218 was illustrated for a single branch instruction in FIG. 7 herein, and further illustrated for multiple resolved branch instructions in FIG. 8. After the step 218, the step 220 is performed. In step 220, the age bits 122, 124, 132, 134, 142, and/or 144 are updated as needed in the BPU 28. Examples of this age bit updating were previously provided in FIGS. 7 and 8. After step 220, the step 222 is performed whereby the valid (V) bits of the branch prediction buffer associated with the correctly predicted branch instruction is cleared due to the determination of a correct prediction. An example of the clearing of valid (V) bits 120, 130, and/or 140 is illustrated in FIGS. 7 and 8 herein. After the clearing of the valid bit in step 222, the algorithm will terminate via a step 226 and await execution of FIG. 11 again at a later time for a later branch instruction.

Returning to step 210, if a branch was mispredicted, as determined by the branch control circuit 29, then a step 212 is performed in FIG. 11. In step 212, the valid (V) bits in the instruction buffer 20 and the completion unit 24 that have SID bits values of a logic one in the SID bit position that corresponds to the particular mispredicted buffer in the branch prediction unit 28 are cleared. This selective clearing of valid (V) bits within the instruction buffer 20 and the completion unit 24 was previously illustrated via FIGS. 9 and 10. After selectively clearing certain valid (V) bits within the instruction buffer 20 and the completion unit 24, the step 214 is performed. In step 214, valid (V) bits associated with branch prediction buffers that have branches older than the mispredicted branch are also cleared due to the misprediction. An example of the operation described in step 214 of FIG. 11 is illustrated within buffer 28b of FIGS. 9 and 10 which contains branch instruction information for the instruction $BC_2$.

After performing step 214, the step 216 is performed in FIG. 11. In step 216 of FIG. 11, a determination is made if the current mispredicted branch is the oldest mispredicted branch in that particular cycle. If the current branch being processed is not the oldest mispredicted branch, then the step 222 of FIG. 11 is performed and the algorithm terminates with step 226 to await subsequent reexecution for another branch instruction. However, if the branch currently being processed in step 216 is the oldest mispredicted branch in the cycle, then a step 224 is performed. In step 224, a mispredict recovery address is provided from the branch prediction unit 28 to the fetch unit 26 via a bus 56. This misprediction recovery address is the BPU-stored recovery address associated with the oldest mispredicted branch instruction within the branch prediction unit 28 as decided by step 216. An example of this provision of the oldest mispredicted branch when two or more branches are found to be mispredicted simultaneously was previously illustrated in FIG. 10. After providing the mispredict recovery address in step 224, the steps 222 and 226 are then performed as previously discussed.

Although the invention has been described and illustrated with reference to specific embodiments, it is not intended that the invention be limited to those illustrative embodiments. Those skilled in the art will recognize that modifications and variations may be made without departing from the spirit and scope of the invention. For example, some processors may make the instruction buffer the entire I cache whereby the I cache and instruction buffer are merged to form the same physical element within the CPU design. Each age bit A0 and/or A1 taught herein may be a plurality of age bits which are encoded in some predetermined manner. The BPU 28 taught herein may be coupled to the dispatch unit 22 and/or to the I cache 18 in addition to or in lieu of the connection to one or more of the instruction buffer or the completion unit. In other words, the source of communication to and from the BPU 28 herein may be altered for different CPU designs. It is important to note that active high and active low logic signals may be used interchangeable herein. Therefore, it is intended that this invention encompass all of the variations and modifications as fall within the scope of the appended claims.

What is claimed is:

1. A data processing system comprising:
   an instruction buffer;
   a completion unit coupled to the instruction buffer;
   a branch prediction unit coupled to the completion unit and the instruction buffer, the branch prediction unit having a plurality of branch prediction buffers for predicting a plurality of branch instructions;
   the instruction buffer comprising:
      a plurality of instruction entries, each instruction entry containing a valid bit;
      a plurality of stream identifier bits;
      an instruction;
      each bit position in the plurality of stream identifier bits associated with a unique one of the plurality of branch prediction buffers; and
      bit values of the plurality of stream identifier bits defining dependence among instructions contained in the plurality of instruction entries;
      wherein a first instruction in a first instruction entry is dependent upon a second instruction in a second instruction entry when a first bit position of the plurality of stream identifier bits of the first and second instruction entries contains a first bit value.

2. The data processing system of claim 1 wherein proper execution of the first instruction is directly dependent upon correct prediction of the second instruction by the branch prediction unit.

3. The data processing system of claim 1 wherein the plurality of stream identifier bits comprises at least three stream identifier bits.

4. The data processing system of claim 1 wherein each branch prediction buffer contains at least one age bit for determining an order of use of the plurality of branch prediction buffers.

5. The data processing system of claim 1 wherein the completion unit comprises a plurality of instruction entries, each instruction entry of the completion unit adapted to contain a valid bit, a plurality of stream identifier bits, and an instruction.

6. A method for performing branch prediction and resolution, the method comprising:
   fetching a plurality of computer instructions, each of the plurality of computer instructions being associated with a plurality of stream identifier bits having bit positions, the plurality of computer instructions being program ordered;
   determining at least one computer instruction that is an unresolved branch instruction within the plurality of computer instructions;
   assigning the unresolved branch instruction to a selected branch prediction buffer selected from a plurality of branch prediction buffers, each branch prediction buffer being associated with a unique one bit position within the plurality of stream identifier bits;
   setting, to a first bit value bit, a first bit position of the plurality of stream identifier bits associated with all instructions in the plurality of computer instructions having a program order greater than a program order of the unresolved branch instruction;
   resolving one branch instruction within one of the plurality of branch prediction buffers as being correctly predicted; and
   clearing, in response to the step of resolving, the first bit value from the first bit position of the plurality of stream identifier bits associated with the one branch instruction.

7. The method of claim 6 further comprising:
   resolving one branch instruction within one branch prediction buffer in the plurality of branch prediction buffers as being incorrectly predicted, the one branch prediction buffer being associated with a bit position in the plurality of stream identifier bits; and
   clearing, in response to the step of resolving, valid bits for all instructions that have the first bit value within the first bit position of the plurality of stream identifier bits.

8. The method of claim 6 further comprising:
   resolving one or more branch instructions within one or more branch prediction buffers in the plurality of branch prediction buffers as being incorrectly predicted, the one or more branch prediction buyers being associated with one or more bit positions in the plurality of stream identifier bits;
   resolving one or more branch instructions within one or more branch prediction buffers of the plurality of branch prediction buffers as being correctly predicted, both steps of resolving occurring concurrently in time;

clearing, in response to the first step of resolving, valid bits for all instructions that have the first bit value within the one or more bit positions of the plurality of stream identifier bits; and clearing, in response to the second step of resolving, the one or more bit positions in the plurality of stream identifier bits.

* * * * *